(12) United States Patent
Leyshon

(10) Patent No.: US 9,139,322 B2
(45) Date of Patent: Sep. 22, 2015

(54) MULTI-PARTITE ARTICLE

(71) Applicant: LEYSHON LIMITED, Chippenham Wiltshire (GB)

(72) Inventor: Timothy Leyshon, Batheaston (GB)

(73) Assignee: LEYSHON LIMITED, Chippenham Wiltshire (GB)

( * ) Notice: Subject to any disclaimer, the term of this patent is extended or adjusted under 35 U.S.C. 154(b) by 0 days.

(21) Appl. No.: 14/407,412

(22) PCT Filed: Jun. 25, 2013

(86) PCT No.: PCT/EP2013/063319
§ 371 (c)(1),
(2) Date: Dec. 11, 2014

(87) PCT Pub. No.: WO2014/009149
PCT Pub. Date: Jan. 16, 2014

(65) Prior Publication Data
US 2015/0144749 A1    May 28, 2015

(30) Foreign Application Priority Data

Jul. 13, 2012  (GB) .................................. 1212579.5

(51) Int. Cl.
*B65B 67/12* (2006.01)
*F21V 1/06* (2006.01)
*A01G 9/02* (2006.01)

(52) U.S. Cl.
CPC .............. *B65B 67/1205* (2013.01); *A01G 9/02* (2013.01); *A01G 9/026* (2013.01); *F21V 1/06* (2013.01); *A47B 2230/0085* (2013.01); *A47B 2230/0092* (2013.01)

(58) Field of Classification Search
CPC .......... A47G 7/00; A47G 7/041; B65B 67/12; B65B 67/1205; B65D 21/08; F21V 1/06; F21V 1/12
See application file for complete search history.

(56) References Cited

U.S. PATENT DOCUMENTS 919,257 A * 4/1909 Seydewitz .................... 108/101
970,398 A * 9/1910 Sapp et al. .................... 141/390
(Continued)

FOREIGN PATENT DOCUMENTS

CN     201894090 U    7/2011
GB         402465       12/1933
(Continued)

OTHER PUBLICATIONS

Van Overbeek, Kajsa "International Search Report and Written Opinion of the International Searching Authority—International Application No. PCT/EP2013/063319" European Patent Office; Sep. 19, 2013; pp. 1-12.
(Continued)

*Primary Examiner* — Gary C. Hoge
(74) *Attorney, Agent, or Firm* — Thomas G. Peterson; Nicholas J. Landau; Bradley Arant Boult Cummings LLP

(57) ABSTRACT

The present invention provides a multi-partite article 20 comprising a plurality of frame members 12 detachably engageable to a plurality of support members 14 to form an article frame 22 in which the plurality of frame members 12 are disposed coaxially and are spaced apart from each other to define an internal volume. The multi-partite article 20 can be assembled and disassembled as required for ease of storage and/or transportation.

20 Claims, 10 Drawing Sheets

(56) References Cited

U.S. PATENT DOCUMENTS

| | | | |
|---|---|---|---|
| 1,075,990 A | | 10/1913 | O'Connell |
| 1,806,852 A | * | 5/1931 | Hamlyn .................. 362/360 |
| 1,940,117 A | * | 12/1933 | Carpos ................ 108/157.18 |
| 3,627,242 A | * | 12/1971 | Vandermast ................ 248/97 |
| 4,064,993 A | | 12/1977 | Getner |
| 4,157,801 A | * | 6/1979 | Elmer ...................... 248/97 |
| 4,354,222 A | | 10/1982 | Gall |
| 4,759,518 A | * | 7/1988 | Yardas ...................... 248/97 |
| 5,222,603 A | | 6/1993 | Ma |
| 5,347,751 A | * | 9/1994 | Carpay ........................ 47/39 |
| 2005/0035250 A1 | | 2/2005 | Schoneboom |
| 2008/0202025 A1 | * | 8/2008 | Temkin et al. ............ 47/41.1 |
| 2009/0206046 A1 | * | 8/2009 | Lunato .................... 211/85.18 |

FOREIGN PATENT DOCUMENTS

| | | |
|---|---|---|
| GB | 584000 | 1/1947 |
| JP | 2002335774 | 11/2002 |
| JP | 2006298594 | 11/2006 |

OTHER PUBLICATIONS

Barcelo, Bryony "Patents Act 1977: Search Report under Section 17(5)—Great Britain Application No. GB1212579.5" United Kingdom Intellectual Property Office; Oct. 8, 2012; pp. 1-4.

* cited by examiner

MULTI-PARTITE ARTICLE

CROSS-REFERENCE TO RELATED APPLICATIONS

This application is a national stage under 35 U.S.C. 371 of International Application PCT/EP2013/063319, filed on Jun. 25, 2013 (currently pending). International Application PCT/EP2013/063319 cites the priority of British Patent Application No. 1212579.5, filed Jul. 13, 2012 (pending).

The present invention relates to a multi-partite article, for example it relates to a flat packable plant pot.

In retail outlets, there is a need to hold stock that is for sale to customers. However, storing stock is expensive due to the large volume of storage space needed to store products that are on sale to customers and the costs associated with this extra retail space. Further, postage costs and transportation costs in general will be higher for a product of larger dimensions. A product with larger dimensions is also more inconvenient for a customer to transport from a retail outlet once purchased.

Plant pots, planters, hanging baskets and other garden storage containers as well as storage containers in general and light shades are provided a wide variety of shapes and sizes. As these articles generally have a base and side walls defining a hollow cavity, storage and transportation of these articles can be very inefficient in terms of the volume of space that they occupy compared to their weight.

It is therefore desirable to provide an improved article which can be stored and transported more efficiently.

According to an aspect of the present invention, there is provided a multi-partite article comprising: a plurality of frame members; a plurality of support members, wherein the plurality of support members are detachably engageable to the plurality of frame members to form an article frame in which the plurality of frame members are disposed coaxially and are spaced apart from each other to define an internal volume; and a locking member detachably engageable to the plurality of support members, wherein the locking member comprises a plurality of locking member recesses arranged such that when the locking member engages with the plurality of support members, each locking member recess corresponds to each support member, and wherein the locking member is arranged such that when the locking member is rotated from an unlocked position in which each support member is located in a locking member recess to a locked position in which each support member is not located in a locking member recess, the locking member urges the support members into an interference fit with the frame members.

The multi-partite article may further comprise a bag detachably connectable to the article frame such that it can be disposed in the internal volume. The bag may define a cavity for receiving soil and/or plants.

Each support member may comprise a support member locking recess corresponding to a locking member recess of the locking member. The locking member may be arranged such that when the locking member is rotated from an unlocked position in which each support member locking recess is located in a locking member recess to a locked position in which each support member locking recess is not located in a locking member recess, the locking member urges the support members into an interference fit with the frame members.

Each frame member may comprise a plurality of frame member recesses. Each support member may comprise a plurality of support member recesses. Each support member recess of a support member may be detachably engageable with a frame member recess of each frame member.

The periphery of the locking member that is engageable with the plurality of support members may be shaped so as to encourage rotation of the locking member.

The periphery of the locking member that is engageable with the plurality of support members may comprise a locking notch, such that when the locking member engages with the plurality of support members in a locked position, a support member may be detachably secured by the locking notch. The periphery of the locking member that is engageable with the plurality of support members may comprise a plurality of locking notches, each corresponding to a support member of the plurality of support members.

The multi-partite article may comprise two or more locking members. Each support member may comprise two or more support member locking recesses each of which is detachably engageable to a locking member recess of each locking member for permitting each locking member to locate with the plurality of support members.

The or each locking member may be detachably engageable with the plurality of support members inside the internal volume of the article. The or each locking member may be detachably engageable with the plurality of support members outside the internal volume of the article.

A locking member may be detachably engageable with the plurality of support members inside the internal volume of the article and a locking member may be detachably engageable with the plurality of support members outside the internal volume of the article.

The plurality of frame members and the plurality of support members may be assembled in a lattice-like structure. The plurality of frame members and the plurality of support members may be held in place in the lattice-like structure by one or more locking members.

The plurality of frame members, the plurality of support members and the one or more locking members may be made of wood, plastics, metal, ceramics, composite material or any other suitable material.

The multi-partite article may be a plant pot, a planter, a hanging basket or other gardening container.

According to another aspect of the invention, there is provided a flat packable container comprising the multi-partite article referred to above.

According to another aspect of the invention, there is provided a flat packable light shade comprising the multi-partite article referred to above.

According to another aspect of the invention, there is provided a flat packable plant pot comprising the multi-partite article referred to above.

Embodiments of the invention will now be described by way of example with reference to the accompanying drawings, of which:

Figure 1:
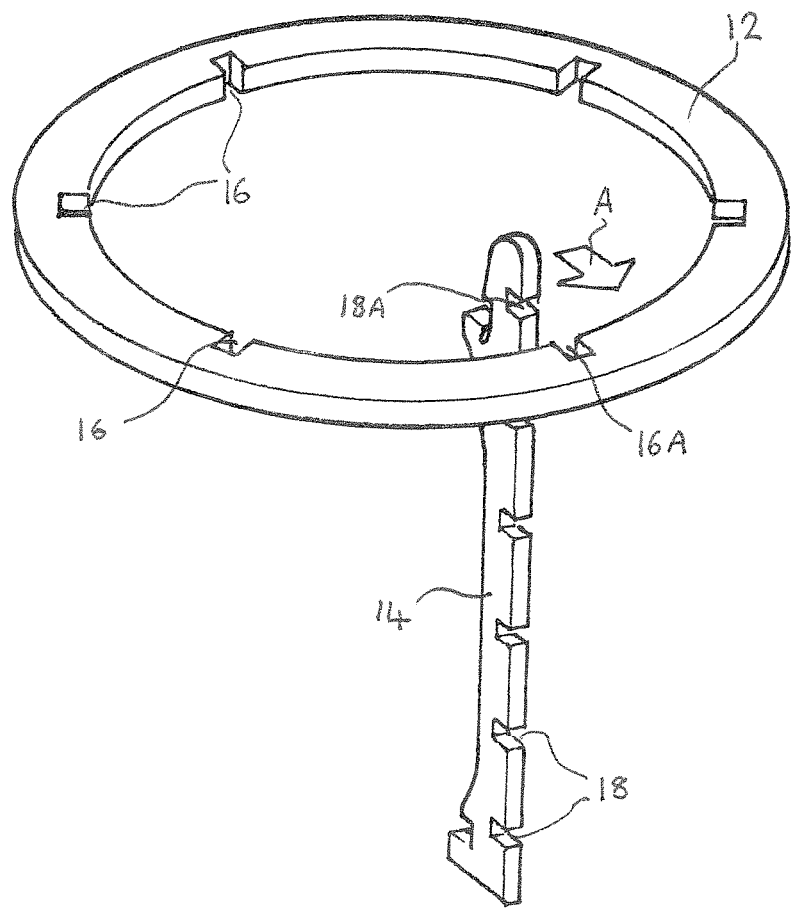
FIG. 1 shows a frame member and a support member of a multi-partite article.

FIG. 1 shows a frame member 12 in the form of a ring that is detachably engageable to a support member 14. The frame member 12 comprises a plurality of frame member recesses 16, and the support member comprises a plurality of support member recesses 18. As can be seen in FIG. 1, a support member recess 18A is engageable with a frame member recess 16A by moving the support member recess 18A in the direction of the arrow A, thereby locating the support member recess 18A in the frame member recess 16A.

FIG. 1 shows only a single frame member 12 and a single support member 14. However, it should be appreciated that in embodiments of the invention, a plurality of frame members 12 and a plurality of support members 14 are provided.

Figure 2:
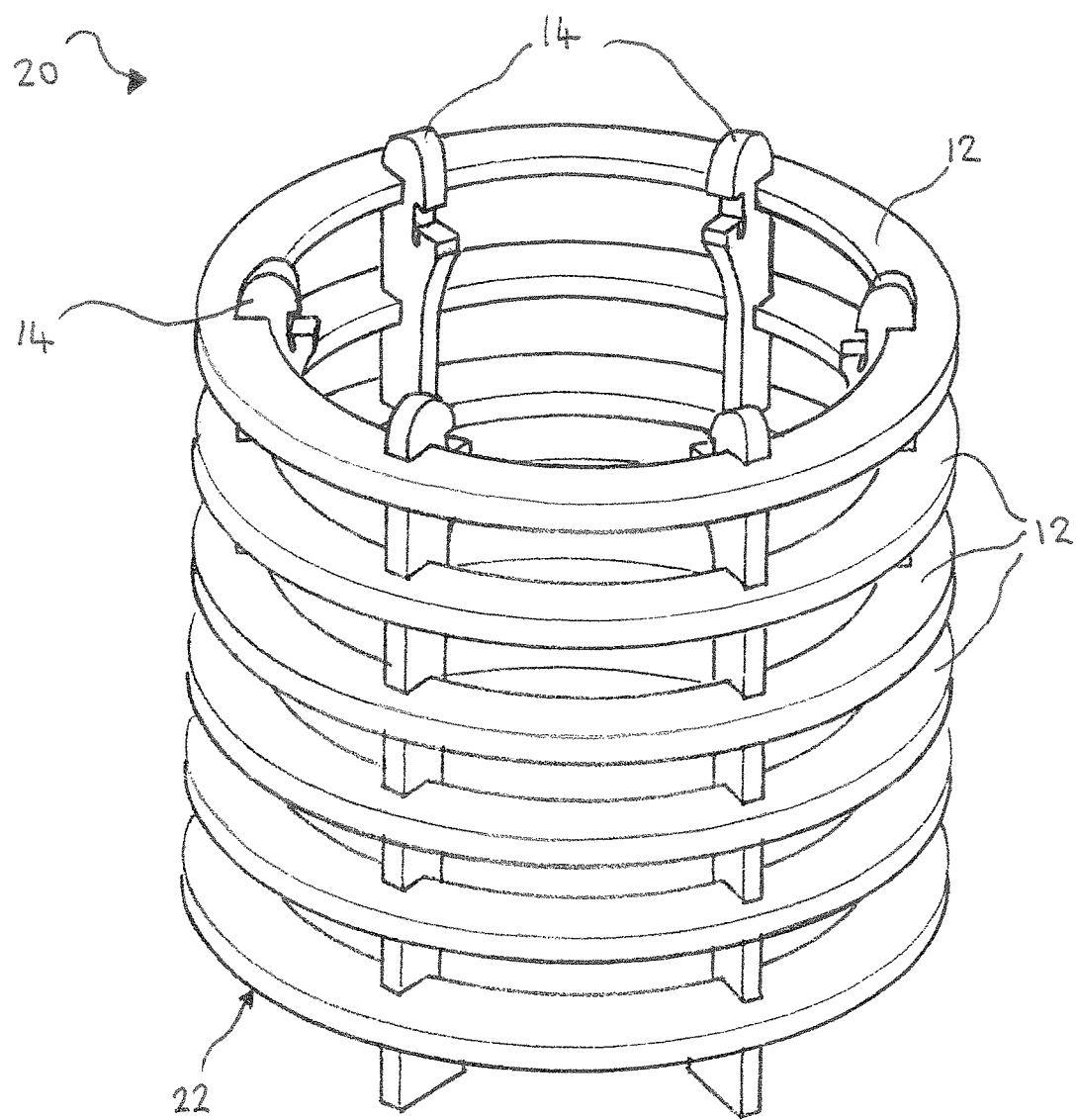
FIG. 2 shows an assembled multi-partite article.

FIG. 2 shows a multi-partite article 20 comprising a plurality of frame members 12 and a plurality of support members 14. FIG. 2 shows the plurality of frame members 12 and the plurality of support members 14 after they have been assembled to form an article frame 22 of the multi-partite article 20. The plurality of frame members 12 and the plurality of support members 14 are assembled in a lattice-like arrangement in which a plurality of spaces are defined between the assembled frame members 12 and support members 14. In FIG. 2, six frame members 12 and six support members 14 are shown, although it should be appreciated that any number of frame members 12 and any number of support members 14 may be provided.

In the multi-partite article 20, each frame member 12 is engaged with each of the plurality of support members 14. Each support member 14 is engaged with each of the plurality of frame members 12. In the multi-partite article 20, the plurality of frame members 12 are coaxially arranged with each other, are spaced apart from each other and are held in position by the plurality of support members 14.

As shown in FIG. 1, each of the frame members 12 comprises a plurality of frame member recesses 16 and each of the support members 14 comprises a plurality of support member recesses 18. In FIG. 2, each frame member recess 16 of a particular frame member 12 corresponds to a support member recess 18 of each support member 14. Each support member recess 18 of a particular support member 14 corresponds to a frame member recess 16 of each frame member 12. In order to assemble the multi-partite article 20, each frame member recess 16 is located in and is in engagement with a support member recess 18. In the embodiment shown in FIG. 2, the frame members 12 and the support members 14 are held in position due to the interference fit between the frame member recesses 16 and the support member recesses 18.

As can be seen in FIG. 2, the frame 22 of the multi-partite article 20 defines an internal volume. This internal volume is defined by the inside of the edges of the frame members 12 and the support members 14. The internal volume allows the multi-partite article 20 to be used as a plant pot, planter, hanging basket or other container, for example as a laundry basket or a bin. Also, the multi-partite article 20 may be used to receive a conventional plant pot inside the internal volume. Further, the internal volume and the lattice-like construction of the multi-partite article 20, allows the assembled multi-partite article 20 to be suitable for use as a lamp shade.

As the plurality of frame members 12 and the plurality of support members 14 are detachably engaged with each other, the multi-partite article can be disassembled when not in use for ease of storage and/or transportation.

Figure 3:
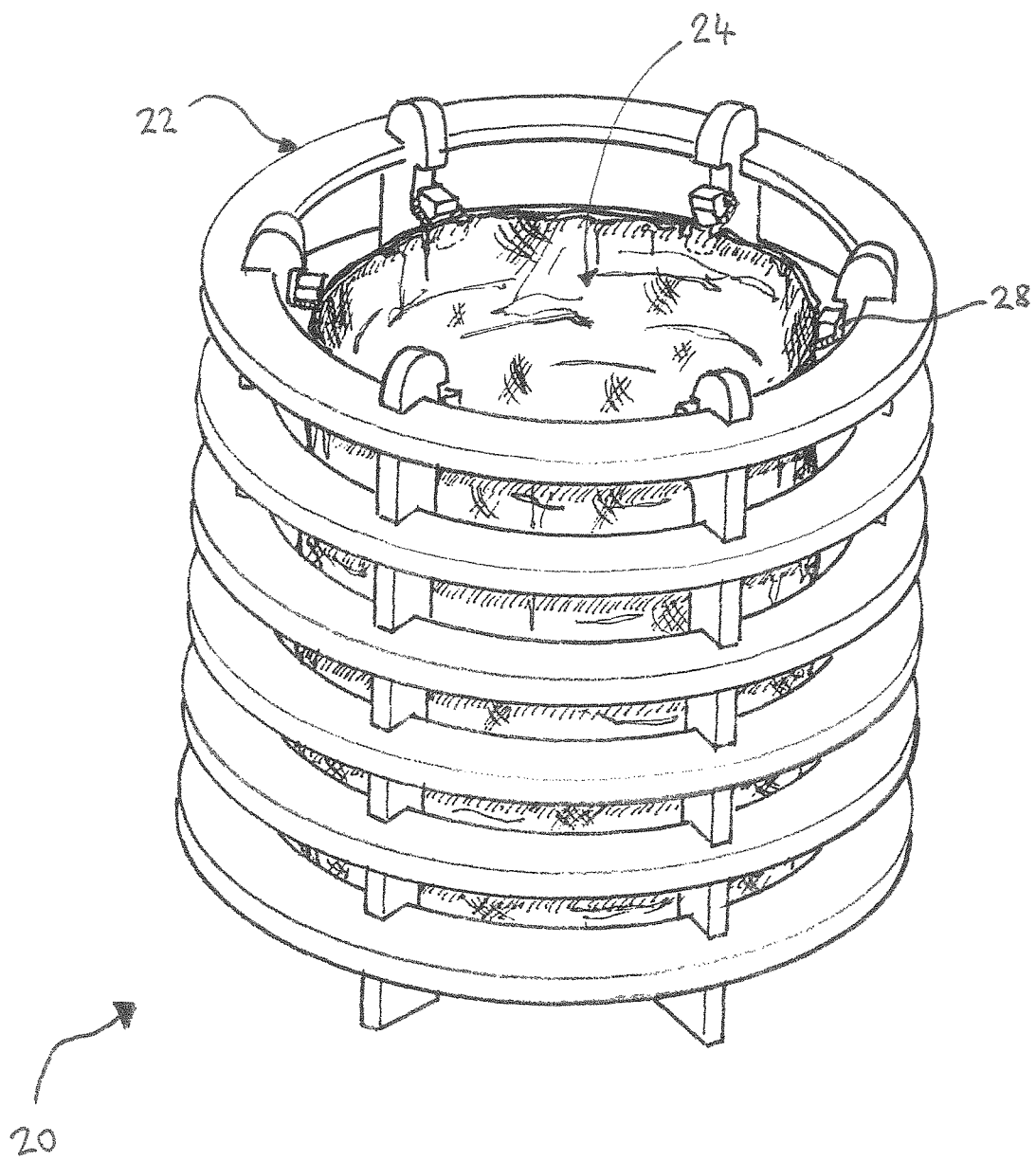
FIG. 3 shows the multi-partite article of FIG. 2 with a bag disposed in the volume defined by the article.

FIG. 3 shows the multi-partite article 20 of FIG. 2, in which a bag 24 is detachably coupled to the frame 22. The bag 24 is disposed within the internal volume defined by the frame 22 and provides additional functionality to the multi-partite article 20. In particular, the bag 24 may made of a material suitable for receiving soil and plants such as a non-porous plastics material, and provision of the bag 24 allows the multi-partite article 20 to be used as a flat packable plant pot. Examples of materials that the bag 24 could be made from include, but are not limited to woven polypropylene geotextile and non-woven polypropylene geotextile.

Figure 4:
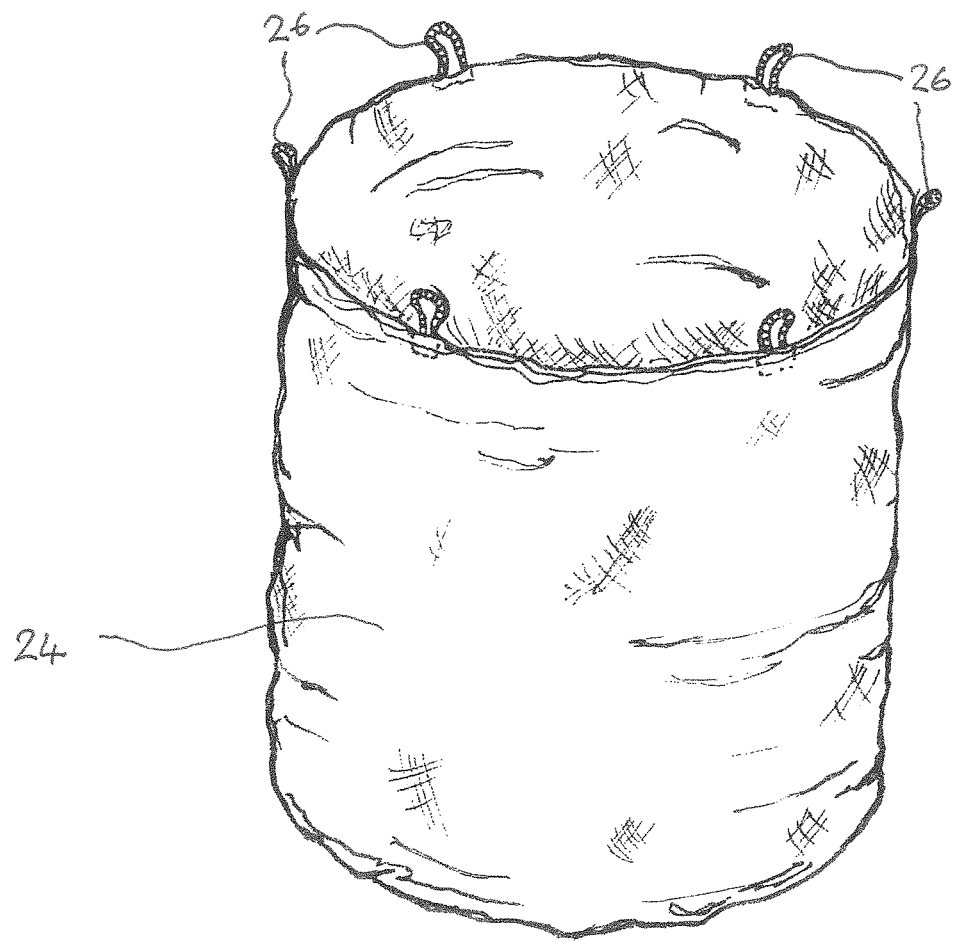
FIG. 4 shows the bag of FIG. 3.
Figure 5:
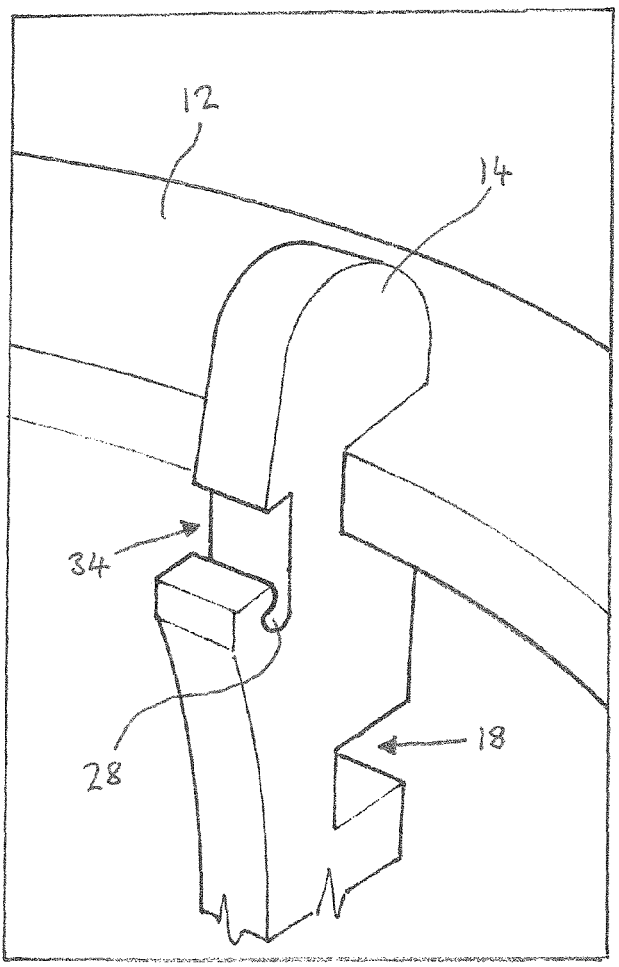
FIG. 5 shows a close up view of a support member.

FIG. 4 shows the bag 24 of FIG. 3. As can be seen more clearly from FIG. 4, the bag 24 comprises a plurality of hooks or loops 26 which can be coupled to the support members 14 by placing the hooks 26 over a portion of the support members 14. Six hooks 26 are shown in FIG. 4, each one corresponding to an individual support member 14. In FIG. 3, when the bag 24 is detachably connected to the frame 22, the hooks 26 of bag 24 are located in bag retaining recesses 28 that are provided in the support members 14. FIG. 5 shows a magnified view of one of the plurality of support member 14, more clearly showing the bag retaining recess 28.

As will be appreciated, although FIGS. 3 to 5 show the bag 24 detachably connected to the frame 22 by locating hooks 26 in bag retaining recesses 28 in the support members 14, any suitable means for detachably connecting the bag 24 to the frame 22 may be used, such as hook and look arrangements, press-studs, buttons, toggles or staples.

FIGS. 1 to 5 show a plurality of frame members 12 detachably engaged to a plurality of support members 14 to form a multi-partite article 20 in which the plurality of frame members 12 are disposed coaxially and are spaced apart from each other to define an internal volume. In FIGS. 1 to 5, the plurality of frame members are engaged to the plurality of support members by an interference fit between the frame member recesses 16 and the support member recesses 18.

Figure 6:
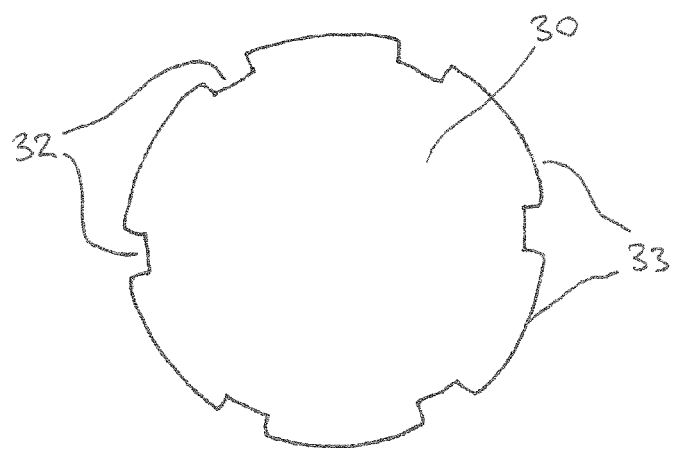
FIG. 6 shows a plan view of a locking member.

In order to improve strength of the assembled multi-partite article, a locking member 30, as shown in FIG. 6, can be used. FIG. 6 shows a locking member 30 comprising a plurality of locking member recesses 32. FIG. 6 shows six locking member recesses 32 provided in the peripheral edge 33 of the locking member 30, each one corresponding to a different support member 14. FIG. 6 shows the locking member 30 as a solid disc. However, it should be appreciated that the locking member 30 may be a ring, with the locking member recesses 32 provided in the peripheral edge of the ring. The peripheral edge 33 of the locking member 30 is the edge of the locking member that is arranged to engage with the plurality of support members 14.

The locking member 30 is engageable with the plurality of support member 14 such that each support member 14 is located in a locking member recess 34 in an unlocked position. As shown in FIG. 5, each support member 14 comprises a support member locking recess 34, into which the locking member recesses 32 can be located when the locking member 30 is engaged with the plurality of support members 14 in an unlocked position.

Figure 7:
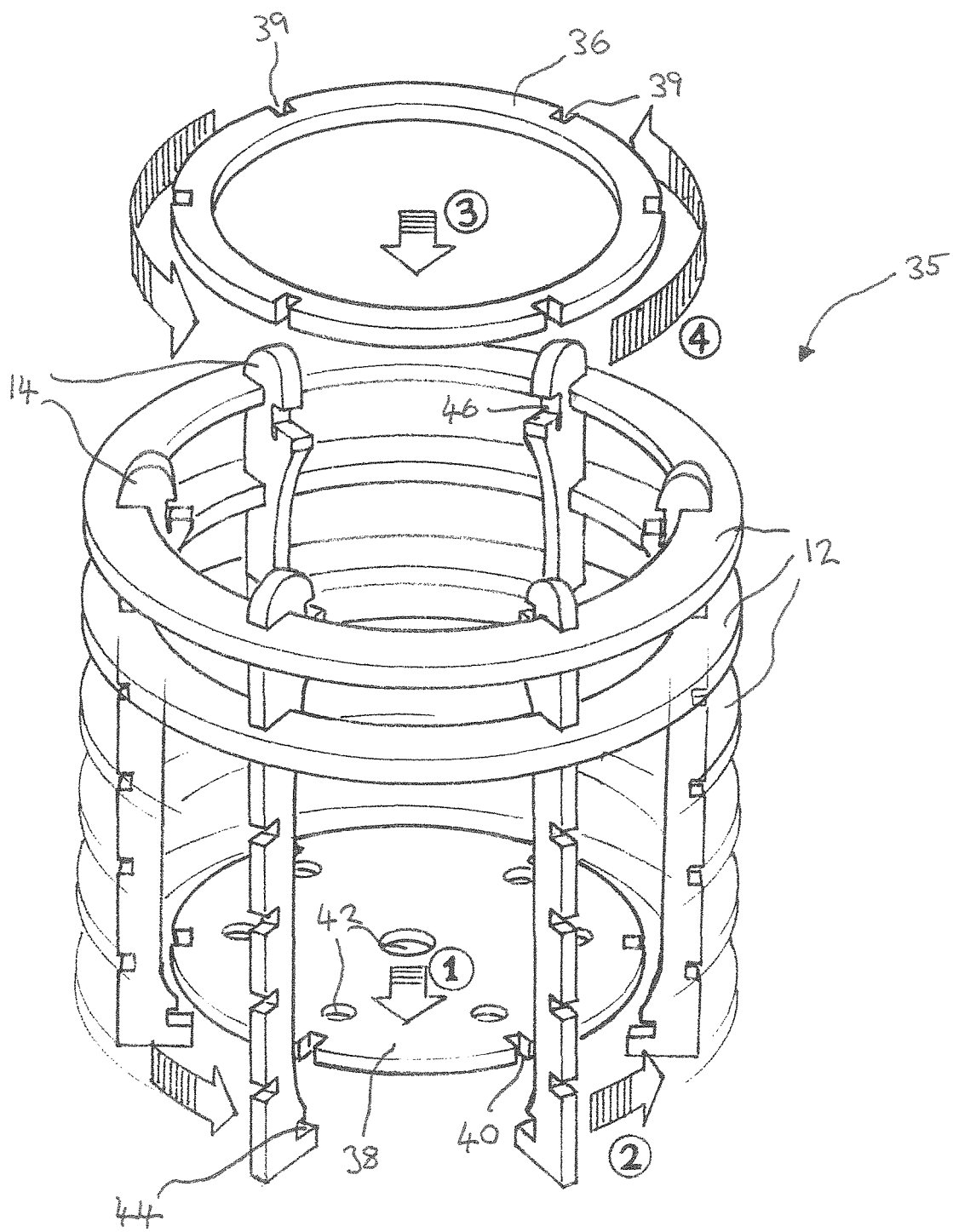
FIG. 7 shows how two locking members engage with the support members of a multi-partite article inside the volume defined by the article.

FIG. 7 shows a multi-partite article 35 comprising a plurality of frame members 12, a plurality of support members 14, an upper locking member 35 and a lower locking member 38. The multi-partite article of FIG. 7 is assembled by detachably engaging the plurality of frame members 12 to the plurality of support members 14, as described in relation to FIGS. 1 to 3, and will not be repeated here for conciseness.

The upper locking member 36 is in the form of a ring and comprises a plurality of upper locking member recesses 39. The lower locking member 38 comprises a plurality of lower locking member recesses 40 and acts as the base of the multi-partite article 35. The lower locking member recess 40 is in the form of a disc with a plurality of holes 42 provided to act as ventilation, drainage and/or to save weight.

The lower locking member 38 is inserted into the multi-partite article 35 by aligning the lower locking member recesses 40 with the plurality of support members 14 and locating each lower locking member recess 40 in a lower support member locking recess 44 of each support member 14, as indicated by the arrow (1).

The lower locking member 38 is locked in place with the plurality of support members 14 by rotating the lower locking member 38 from an unlocked position in which each support member locking recess 44 is located in a locking member recess 40 to a locked position in which each support member locking recess 44 is not located in a locking member recess 40, as indicated by the arrow (2). Rotation of the lower locking member 38 acts to urge the support members 14 into an interference fit with the frame members 12, as in the locked position, the support member locking recesses 44 are engaged with the peripheral edge of the lower locking member 38 instead of being engaged with the locking member recesses 40 as in the unlocked position.

The upper locking member 36 is inserted by aligning the upper locking member recesses 39 with the plurality of support members 14 and locating each upper locking member recess 39 located in an upper support member locking recess 46 of each support member 14, as shown by the arrow (3).

The upper locking member 36 is locked in place with the plurality of support members 14 by rotating the upper locking member 36 from an unlocked position in which each support member locking recess 46 is located in a locking member recess 39 to a locked position in which each support member locking recess 46 is not located in a locking member recess 39, as indicated by the arrow (4). Rotation of the upper locking member 36 acts to urge the support members 14 into an interference fit with the frame members 12, as in the locked position, the support member locking recesses 46 are engaged with the peripheral edge of the upper locking member 36 instead of being engaged with the locking member recesses 39 as in the unlocked position.

The locking members 36, 38 may be shaped so as to cam, such that as the locking members are rotated from the unlocked position to the locked position, the can shape of the locking members act to urge the support members 14 into an interference fit with the frame members 12.

Figure 8:
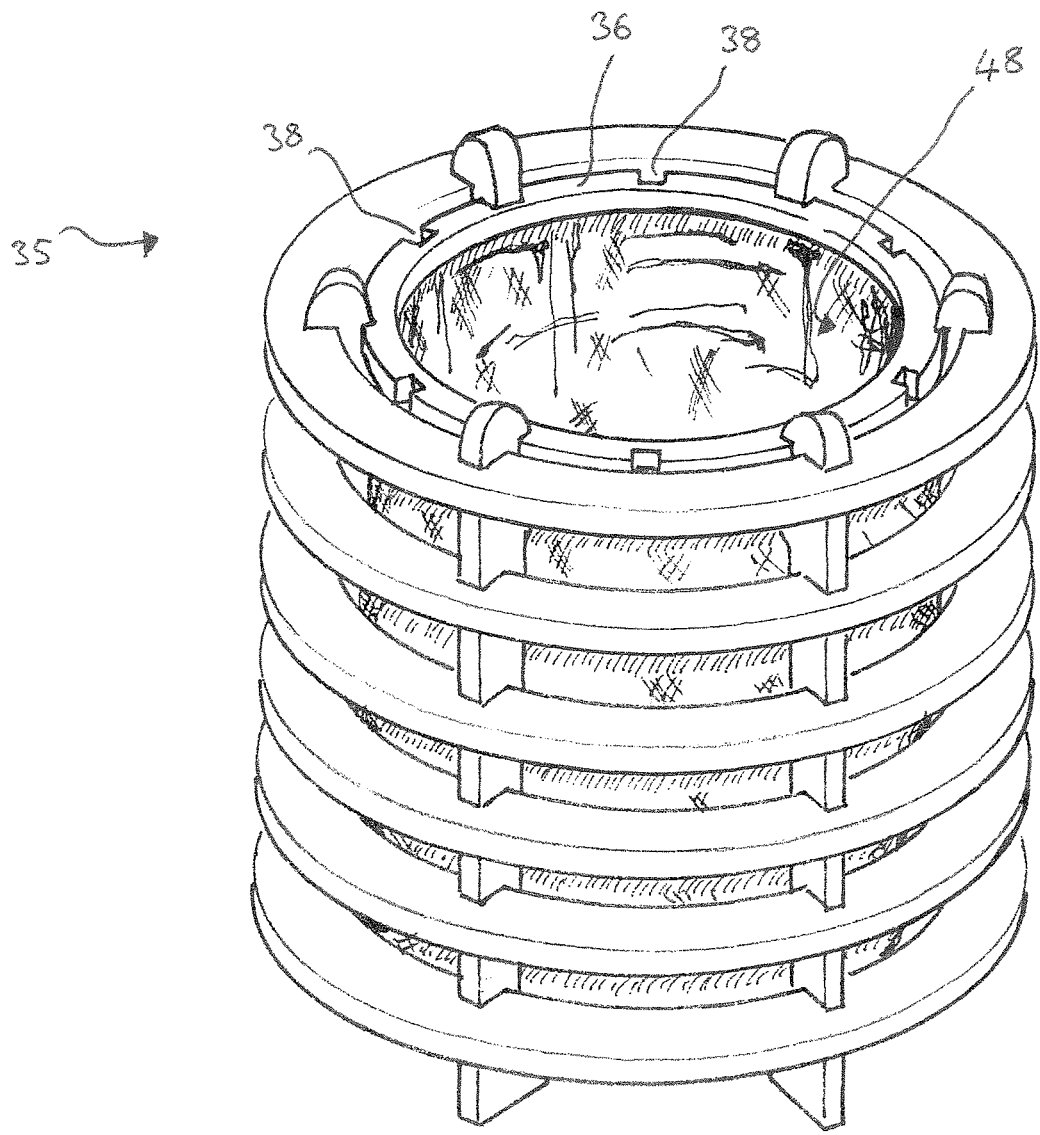
FIG. 8 shows the multi-partite article of FIG. 7.

FIG. 8 shows the assembled multi-partite article 35 of FIG. 7. As can be seen in FIG. 8, the upper locking member 36 is in the locked position in which each support member locking recess 46 is not located in a locking member recess 39 and the peripheral edge of the upper locking member 36 is engaged with the support member locking recesses 46. The lower locking member 38 is not visible in FIG. 8.

FIG. 8 shows the multi-partite article 35 having a bag 48 disposed in the internal volume defined by the frame of the multi-partite article. The bag 48 is detachably connected to the multi-partite article 35 in the same way as described above in relation to FIG. 3.

In FIGS. 7 and 8, the locking members are provided to urge the support members into an interference fit with the frame members from inside the internal volume defined by the multi-partite article frame. However, it should be appreciated that equally, locking members may be provided which are capable of urging the plurality of support members into an interference fit with the plurality of frame members from outside of the internal volume defined by the multi-partite article frame.

Figure 9:
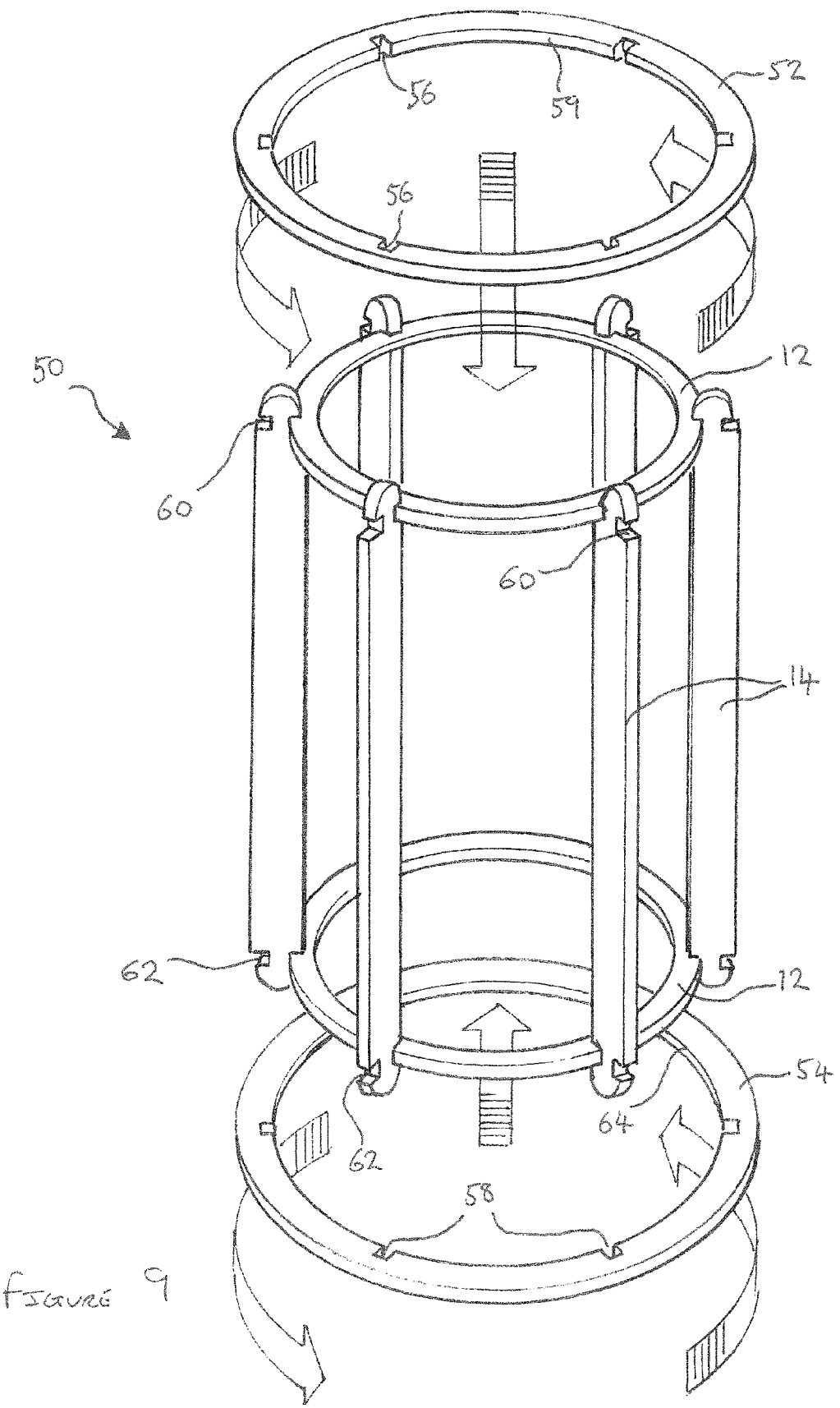
FIG. 9 shows a multi-partite article in which the locking members are disposed outside the volume defined by the article.

FIG. 9 shows a multi-partite article 50 according to an embodiment of the invention, in which an upper locking member 52 and a lower locking member 54 are provided to secure the plurality of frame members 12 in an interference fit with the plurality of support members 14 from outside the internal volume defined by the multi-partite article 50. For simplicity, only two frame members 12 are shown in FIG. 9, but it should be appreciated that as in FIGS. 1 to 8, a plurality of frame members 12 are provided.

The upper locking member 52 comprises a plurality of upper locking member recesses 56. The lower locking member 54 comprises a plurality of lower locking member recesses 58. Upper support member locking recesses 60 and lower support member locking recesses 62 are provided in the surface of the support members 14 that is opposite to the surface that engages with the frame members 12. The upper and lower locking members 52, 54 locate in the upper support member locking recesses 60 and lower support member locking recesses 62 outside of the internal volume defined by the multi-partite article frame.

The upper locking member 52 is locked in place with the plurality of support members 14 by rotating the upper locking member 52 from an unlocked position which each support member locking recess 60 is located in a locking member recess 56 to a locked position in which each support member locking recess 60 is not located in a locking member recess 56. Rotation of the upper locking member 52 acts to urge the support members 14 into an interference fit with the frame members 12, as in the locked position, the support member locking recesses 60 are engaged with the edge 59 of the upper locking member 52 instead of being engaged with the locking member recesses 56 as in the unlocked position.

The lower locking member 54 is locked in place with the plurality of support members 14 by rotating the lower locking member 54 from an unlocked position in which each support member locking recess 62 is located in a locking member recess 58 to a locked position in which each support member locking recess 62 is not located in a locking member recess 58. Rotation of the lower locking member 58 acts to urge the support members 14 into an interference fit with the frame members 12, as in the locked position, the support member locking recesses 62 are engaged with the edge 64 of the lower locking member 54 instead of being engaged with the locking member recesses 58 as in the unlocked position.

Figure 10:
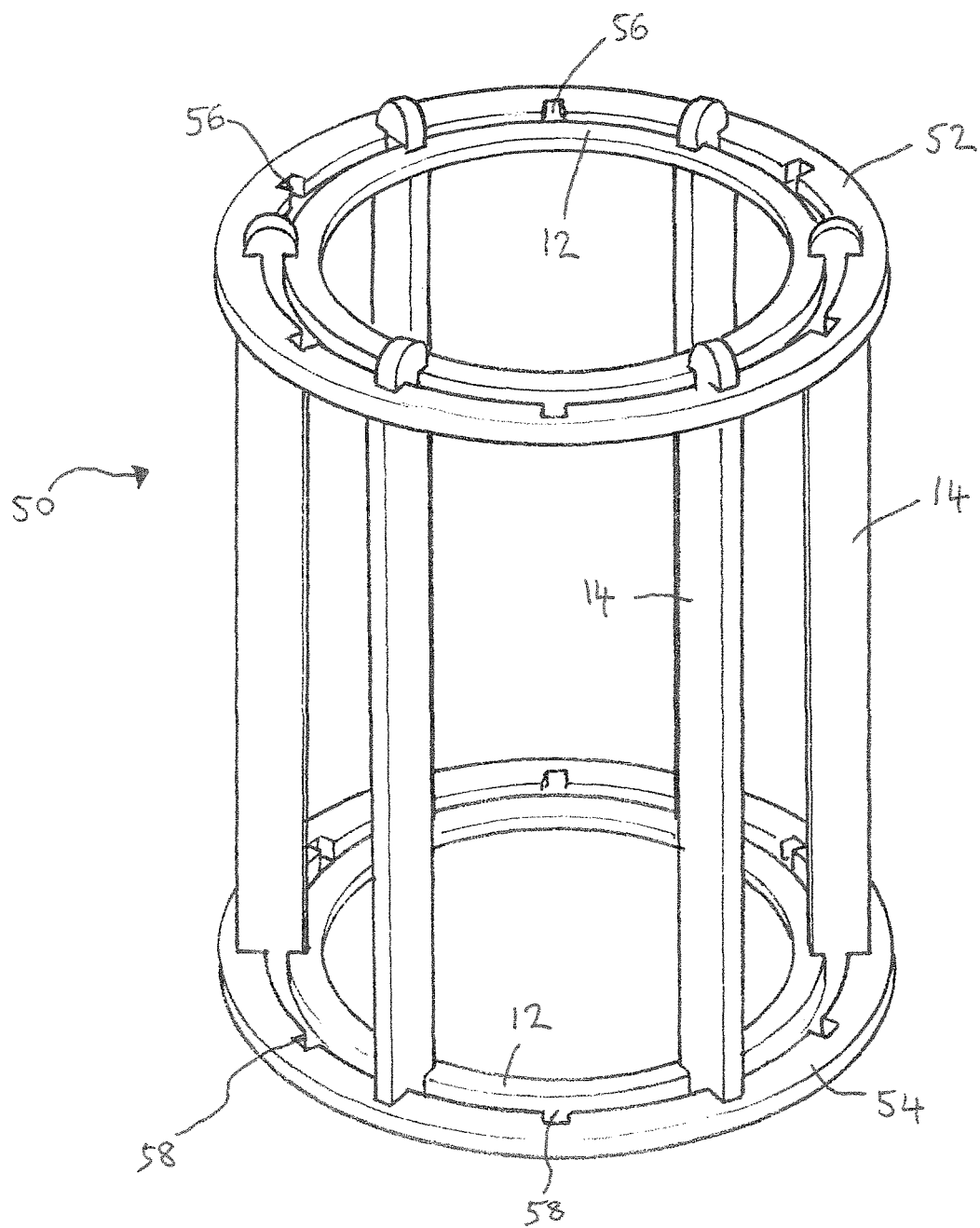
FIG. 10 shows the assembled multi-partite article of FIG. 9.

FIG. 10 shows the assembled multi-partite article 50 of FIG. 9. Again, as in FIG. 9, only two frame members 12 are shown in FIG. 10. As can be seen in FIG. 10, the upper locking member 52 and the lower locking member 54 are shown in their locked positions in which each upper support member locking recess 56 and each lower support member locking recess 58 is not located in an upper locking member recess 60 and each lower support member locking recess 58 is not located in a lower locking member recess 62.

As will be appreciated, as shown in FIGS. 3 and 8, the multi-partite article of FIG. 10 may also be provided with a bag disposed in the internal volume defined by the frame of the multi-partite article 50.

Although FIGS. 7 to 10 show multi-partite articles comprising two locking members, it should be appreciated that only a single locking member may be provided or alternatively, more than two locking members may be provided. Also, although the above describes the use of locking member with support member locking recesses, it should be understood that each support member may not have a support member locking recess and the support member itself rather than a support member locking recess may be located in the locking member recess in the unlocked position.

Figure 11:
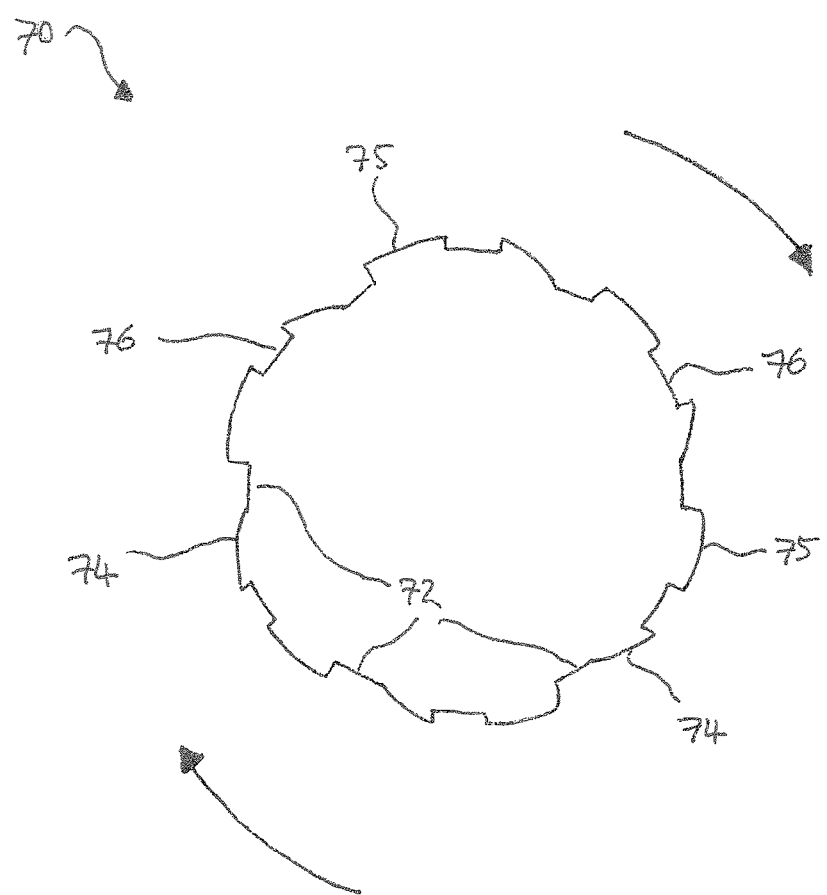
FIG. 11 shows an alternative embodiment of the locking member.

FIG. 11 shows a locking member 70 according to another embodiment of the invention. The locking member 70 is similar to the locking member 30 of FIG. 6 in that rotation of the locking member 70 from an unlocked position to a locked position will act to urge the support members into an interference fit with the frame members in much the same way as described in relation to FIGS. 7 to 10.

Locking member 70 comprises a plurality of locking member recesses 72 that are arranged to locate with the support members or support member locking recesses, as described above. Locking member 70 differs from locking member 30 of FIG. 6 in that locking member 70 also comprises chamfered portions 74 in the peripheral edge 75 of the locking member 70 adjacent to the locking member recesses 72. The chamfered portions are shaped so as to encourage rotation of the locking member 70 and make rotation of the locking member 70 easier during assembly of the multi-partite article. Further, the locking member 70 also comprises locking notches 76 in the peripheral edge 75 of the locking member 70 adjacent to the chamfered portions 74. The locking notches 76 are arranged so as to receive the support members or support member locking recesses in the locked positions.

In an unlocked position, support members or support member recesses of the support members will be located in the locking member recesses 72. Rotation of the locking member 70 in the direction of the arrows will cause the support members or support member recesses to engage with the chamfered portions 74. Further rotation, facilitated by the shape of the chamfered portions 74, will cause the support members or support member recesses to engage with the locking notches 76, which will act to secure the support members or support member recesses in a locked position and prevent rotation of the locking member 70 from the locked position.

As can be seen in FIG. 11, the locking notches 76 are not as deep as the locking member recesses 72 with respect to the peripheral edge 75 of the locking member 70, and as such will act to urge the support members into an interference fit with the frame members when the locking member 70 is in the locked position.

Although the locking member 70 shown in FIG. 11 is suitable for urging the support members into an interference fit with the frame members from inside the article volume, it should also be appreciated that the chamfered portions 74 and the locking notches 76 may also be provided in a locking member suitable for urging the support members into an interference fit with the frame members from outside the article volume.

Also, although FIG. 11 shows both the chamfered portions 74 and locking notches 76 in combination, it should be appreciated that either the chamfered portions 74 or locking notches may be provided. Further, although FIG. 11 shows six chamfered portions and six locking notches, one corresponding to each of the six support members, it should be appreciated that any number of chamfered portions and/or any number of locking notches may be provided. For example, only a single locking notch may be provided to secure one of the plurality of support members, thereby preventing rotation of the locking member from the locked position.

As will be appreciated, the embodiments described above provide a kit of parts that can be assembled to form a multi-partite article that allows the article to be assembled and disassembled as required for storage or transportation.

As will be understood, although the above describes the frame member 12 comprising a plurality of frame member recesses 16 and the support member 14 comprising a plurality of support member recesses 18, only one of the frame members 12 or the support member 14 may be provided with recesses. Further, it should be understood that both the frame member 12 and the support member 14 may comprise no recesses.

If recesses are provided on one of the frame member 12 or the support member 14, then the frame members and support members may be held together by the interference fit between the frame member recesses and the support member or the support member recesses and the frame member. Further, if no recesses are provided on the frame members or on the support members, the frame members and the support members may be held together by the interference fit between the frame members 12 and support members 14.

As will be appreciated, although the Figures show a multi-partite article that is substantially cylindrical in shape, any shaped article may be provided by suitable modification of the size and shape of the frame members 12 and the support members 14. For example, the multi-partite article may be bell shaped, it may be substantially conical in shape, it may be cubic or it can be any other desired three dimensional shape.

In the case of a multi-partite article have a polygonal cross section, one or more locking members may still be provided, in which locking member recesses may be shaped (chamfered) such that the recesses are at an angle with respect to the support members/support member recesses in the unlocked position. The shape of the locking member recesses may be such that a small rotation of the locking member will cause the support members/support member recesses into an interference fit with the shaped (chamfered) portion of the locking member recesses. Therefore, in the example of a multi-partite article having a rectangular cross section and a rectangular locking member, rotation of the locking member by only a few degrees would enable the rectangular locking member to engage with the support members and urge the support members into an interference fit with the frame members.

Although the above shows the frame members 12 being provided as one-piece construction, it should be appreciated that the frame members may be provided of a two-piece, or even two or more piece construction in order to make the manufacture of the frame members 12 more efficient. The two or more piece frame members twelve may be coupled together, permanently by glue, staples or the like, or they be removably coupled together by interference fit or the like, before the frame members are assembled to form the multi-partite article. It will be appreciated that by manufacturing the frame members 12, for example in a CNC process, in two or more pieces, it is possible to decrease the amount of material wastage in the manufacturing process as more frame members could be manufactured from a given area of material.

The invention claimed is:

1. A multi-partite article comprising:
    a plurality of frame members;
    a plurality of support members, wherein the plurality of support members are detachably engageable to the plurality of frame members to form an article frame in which the plurality of frame members are disposed coaxially and are spaced apart from each other to define an internal volume; and
    a locking member detachably engageable to the plurality of support members, wherein the locking member comprises a plurality of locking member recesses arranged such that when the locking member engages with the plurality of support members, each locking member recess corresponds to each support member, and wherein the locking member is arranged such that when the locking member is rotated from an unlocked position in which each support member is located in a locking member recess to a locked position in which each support member is not located in a locking member recess, the locking member urges the support members into an interference fit with the frame members.

2. The multi-partite article according to claim 1, further comprising a bag detachably connectable to the article frame such that it can be disposed in the internal volume.

3. The multi-partite article according to claim 2, wherein the bag defines a cavity for receiving soil and/or plants.

4. The multi-partite article of claim 2, wherein each support member comprises a bag retaining recess and the bag comprises a plurality of hooks or loops corresponding to the bag retaining recesses.

5. The multi-partite article according to any-preceding claim 1, wherein each support member comprises a support member locking recess corresponding to a locking member recess of the locking member.

6. The multi-partite article according to claim 5, wherein the locking member is arranged such that when the locking member is rotated from an unlocked position in which each support member locking recess is located in a locking member recess to a locked position in which each support member locking recess is not located in a locking member recess, the locking member urges the support members into an interference fit with the frame members.

7. The multi-partite article according to claim 1, wherein each frame member comprises a plurality of frame member recesses.

8. The multi-partite article according to claim 7, wherein each support member comprises a plurality of support member recesses, and each support member recess of a support member is detachably engageable with a frame member recess of each frame member.

9. The multi-partite article according to claim 1, wherein each support member comprises a plurality of support member recesses.

10. The multi-partite article according to claim 1, wherein the periphery of the locking member that is engageable with the plurality of support members is shaped so as to encourage rotation of the locking member.

11. The multi-partite article according to claim 1, wherein the periphery of the locking member that is engageable with the plurality of support members comprises a locking notch, such that when the locking member engages with the plurality of support members in a locked position, a support member is detachably secured by the locking notch.

12. The multi-partite article of claim 11, wherein the periphery of the locking member that is engageable with the plurality of support members comprises a plurality of locking notches, each corresponding to a support member of the plurality of support members.

13. The multi-partite article according to claim 1, comprising two or more locking members.

14. The multi-partite article according to claim 13, wherein each support member comprises two or more support member locking recesses each of which is detachably engageable to a locking member recess of each locking member for permitting each locking member to locate with the plurality of support members.

15. The multi-partite article according to claim 1, wherein the or each locking member is detachably engageable with the plurality of support members inside the internal volume of the article.

16. The multi-partite article according to claim 1, wherein the locking member is detachably engageable with the plurality of support members outside the internal volume of the multi-partite article.

17. A flat packable container comprising the multi-partite article according to claim 1.

18. A flat packable light shade comprising the multi-partite article according to claim 1.

19. A flat packable plant pot comprising the multi-partite article according to claim 1.

20. The multi-partite article of claim 1, wherein each of the frame members comprises a two or more piece construction.

* * * * *